United States Patent

[11] 3,545,503

| [72] | Inventors | Ryoichiro Oshima;<br>Sigeru Tanaka, Hitachi-shi, Japan |
|---|---|---|
| [21] | Appl. No. | 774,024 |
| [22] | Filed | Nov. 7, 1968 |
| [45] | Patented | Dec. 8, 1970 |
| [73] | Assignee | Hitachi, Ltd.<br>Tokyo, Japan<br>a corporation of Japan |
| [32] | Priority | Nov. 17, 1967 |
| [33] | | Japan |
| [31] | | No. 73656 |

[54] GRANULAR SUBSTANCE FILLING APPARATUS
4 Claims, 5 Drawing Figs.

[52] U.S. Cl. .................................................. 141/286,
259/24, 416/244
[51] Int. Cl. ..................................................... B65b 1/14,
B01f 7/18, F04d 25/04
[50] Field of Search ....................................... 141/286;
259/22, 23, 24; 416/171, 175, 244

[56] References Cited
UNITED STATES PATENTS

| 1,072,771 | 9/1913 | Pittaluga ...................... | 141/286 |
| 2,498,209 | 2/1950 | Fredale ........................ | 259/23 |
| 3,256,916 | 6/1966 | Silletti ......................... | 141/286 |
| 3,339,897 | 9/1967 | Davis, Jr. ...................... | 259/24 |

FOREIGN PATENTS

| 159,586 | 11/1954 | Australia ..................... | 141/285 |

*Primary Examiner*—William L. Freeh
*Attorney*—Craig and Antonelli

ABSTRACT: A granular substance filling apparatus capable of filling a granular substance in a container uniformly, said apparatus including granular substance spreading means disposed in said container and being rotated at a substantially constant rate of speed while having the granular substance being supplied to the center of rotation thereof, and said spreading means having a sloped surface expanding radially from the center of rotation thereof and such a peripheral edge profile which substantially satisfies the equation $r^2 = r_1^2 + \frac{\theta}{n\pi}(r_2^2 - r_1^2)$ wherein $n$ is 1 or 2, $r$ the distance from the center of rotation to the peripheral edge of the spreading means at $\theta$, $r_1$ the radius of a projection formed at the center of the spreading means, $r_2$ the maximum value of $r$ as determined by the inner diameter of the container and $\theta$ the angle of rotation of $r$ from the center of rotation of the spreading means.

PATENTED DEC 8 1970

INVENTORS
RYOICHIRO OSHIMA
SIGERU TANAKA

BY Craig & Antonelli

ATTORNEYS

INVENTOR;
RYOICHIRO OSHIMA
SIGERU TANAKA

BY Craig & Antonelli

ATTORNEYS

GRANULAR SUBSTANCE FILLING APPARATUS

This invention relates to a novel apparatus for filling granular substances therein.

In an apparatus wherein a desired mass transfer, physical change or chemical reaction of materials is carried out by contact between a granular substance, such as, for example, active carbon, filled in a container and a fluid passing through the packed bed of granular substance, it is necessary to make the velocity distribution of the fluid in the packed bed uniform, and in order to obtain a uniform velocity distribution of fluid, the particle size distribution of the granular substance at any portion of the packed bed must be made as uniform as possible.

On the other hand, however, the particles of a granular substance usually have complicated external configurations and varying sizes. For this reason, when such a granular substance is fed into a container carelessly through a conduit or the like, the major part of the particles of larger size is distributed to and settled at a position exteriorly of the position in which the particles of smaller size drop and settle. Namely, the size of the particles settled in the container progressively increases radially with respect to the open end of the conduit and thus a uniform particle size distribution cannot be obtained in the packed bed of granular substance formed in the container.

With such condition of the packed bed of a granular substance, a major portion of a fluid passed through the packed bed flows through that portion thereof where the flow resistance is comparatively small, that is, the portion of the packed bed where the particles of larger size are located. This, after all, means a reduction of the effective reaction surface and is extremely undesirable.

Such a tendency is more apparent as the size of the container becomes larger, and this makes it extremely difficult to increase the size of the apparatus.

In order to deal with such problem, it is conceivable to employ a method wherein the open end position of the conduit is shifted manually to make the particle size distribution uniform in the granular substance bed, but even by this method it is difficult to obtain a satisfactorily uniform particle distribution throughout the packed bed. In addition, granular substances used for a chemical reaction mostly include particles of extremely small size and these particles are scattered in the air during operation of the method, frequently causing the attendant to suffer chest diseases. Precautions against such health hazards are required particularly when the granular substance used is toxic in nature and in this view automatization of this type of operation is desired.

The object of the present invention is to provide a novel and effective granular substance filling apparatus which has been achieved in consideration of various matters as mentioned above.

According to the present invention, there is provided a granular substance filling apparatus which comprises a container for receiving a granular substance therein; granular substance spreading means rotatably disposed in said container in such a manner as to be able to fill the granular substance in said container, said spreading means having a sloped surface expanding radially from the center of rotation thereof and such a peripheral edge configuration which substantially satisfies the equation $$r^2 = r_1^2 + \frac{\theta}{n\pi}(r_2^2 - r_1^2)$$

wherein $n$ is 1 or 2, $r$ the distance from the center of rotation to the peripheral edge of the spreading means at $\theta$, $r_1$ the radius of a projection formed at the center of rotation of the spreading means, $r_2$ the maximum value of $r$ as determined by the inner diameter of the container and $\theta$ the angle of rotation of $r$ from the center of rotation of the spreading means; and means for supplying the granular substance to the center of rotation of said spreading means.

Further, according to the present invention, there is provided a granular substance filling apparatus of the character described above, wherein means is provided for supplying to the center of rotation of said spreading means a mixture of a fluid and a granular substance.

Further, according to the present invention, there is provided a granular substance filling apparatus of the character described above, wherein said spreading means is floated on a liquid for free rotation at a constant rate and provided with impeller means so that said spreading means may be rotated by the coaction between the mixture of fluid and granular substance and said impeller means.

Further, according to the present invention, there is provided a granular substance filling apparatus of the character described above, wherein said spreading means is provided on its sloped surface with a plurality of partition plates extending radially from the center of rotation thereof.

The apparatus of the invention will be more fully understood from the following detailed description when taken in conjunction with the accompanying drawings, in which.

Figure 1:
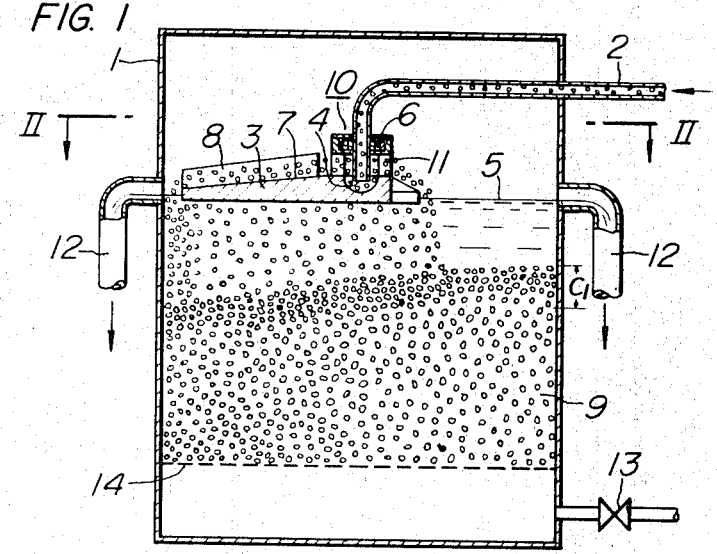
FIG. 1 is a vertical sectional view illustrating an embodiment of the granular substance filling apparatus according to the present invention.
Figure 2:
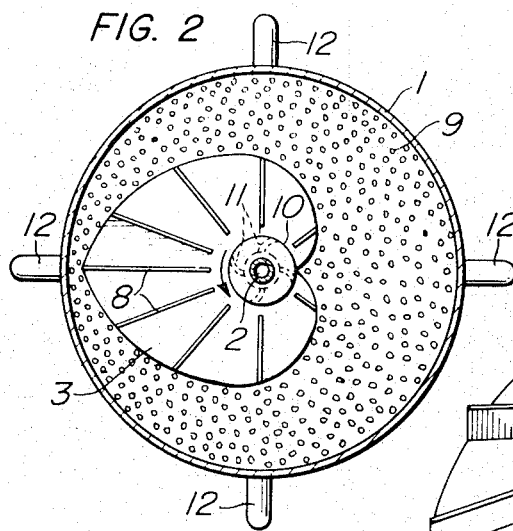
FIG. 2 is a sectional plan view taken on the line II–II of FIG. 1.
Figure 5:
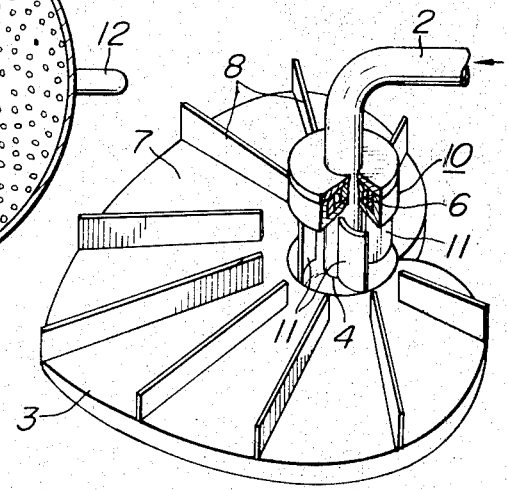
FIG. 5 is a perspective view of the spreading means, with a portion thereof shown in section.

Referring to the drawings, a granular substance to be filled in a container 1 is supplied onto a spreader 3 through a conduit 2 as a mixture with a fluid, e.g., air or water.

The purpose of mixing the granular substance with the fluid is to carry the granular substance in a relatively simple manner. Therefore, when the granular substance is not mixed with a fluid, other suitable transporting means, e.g., conveyor means, etc., may be used.

The mixture of granular substance and fluid supplied onto the spreader 3 through the conduit 2 in the manner described, is fed to the center of rotation of the spreader 3 from an open end 4 of the conduit 2.

The spreader 3 is rotatably supported by the conduit 2 through a bearing 6 while floating on the surface of a liquid 5.

Alternatively, the spreader 3 may be suspended on the conduit 2 without being supported in the floated state on the liquid surface 5, but in this case the cost of the apparatus rises because the conduit 2 and the bearing 6 must be made relatively rigid in structure for supporting said spreader.

Further, by floating the spreader 3 on the liquid surface 5 the following advantage is brought about.

Namely, such an arrangement helps minimize the scattering of fine particles into the air which occurs during the supply of the granular substance onto the spreader 3 when the granular substance is transported as a mixture with air or by conveyor means.

More practically, the particles of the granular substance supplied through the conduit 2 onto the spreader 3 roll down on a sloped surface 7 of said spreader expanding radially from the center of rotation of the spreader and drop gravitationally into the container 1 from the peripheral edge of said spreader. In this case, some of the fine particles tend to fly into the air, but with the arrangement described above, these fine particles are caught by the liquid upon contact with the liquid surface 5. Therefore, the arrangement is highly effective for the protection of the human body when the granular substance is toxic in nature.

The particles of the granular substance leaving the peripheral edge of the spreader 3 immediately go into the liquid from the liquid surface 5 and drop through the liquid under gravity, so that an excellent particle size distribution can be obtained as compared with the case wherein the particles drop in the air under gravity and in addition breakage of the particles can be avoided where the particles are vulnerable to breakage. Such a tendency is particularly remarkable when a liquid (which is preferably water from an economical standpoint) is used as the fluid.

By use of a liquid, the movement of the particles on the sloped surface 7 is rendered highly smooth and uniform, and this tendency is further promoted by a plurality of partition plates 8 provided on said sloped surface 7.

For forming a packed bed 9 of granular substance of uniform particle size distribution in the container 1, it is preferable to rotate the spreader 3 at a fixed rate of speed at the same time when the granular substance is supplied.

For this purpose, the spreader 3 is preferably provided with suitable rotating means in addition to the bearing 6 through which said spreader is rotatably supported on the conduit 2. Reference numeral 10 designates impeller means provided for the purpose above described, which has a plurality of blades 11 arranged with a suitable spacing between adjacent ones thereof.

The arrangement is made such that the granular substance and the fluid are supplied as a mixture with each other from the open end 4 of the conduit 2 onto the sloped surface 7 of the spreader 3 through the spacing between the adjacent ones of the plurality of blades 11, and therefore the spreader 3 can be easily rotated by the energy of said fluid. The rotating force for the spreader 3 may be made substantially constant by supplying the mixture at a constant rate.

In order for the spreader 3 to be capable of dropping the granular substance so as to produce a uniform particle size distribution, the spreader must be rotated at a constant rate of speed as described above, but in add addition the peripheral edge of the spreader must have a special profile.

Namely, whether or not a uniform or flat surface of the granular substance bed is obtained in the container 1 depends upon the profile of the peripheral edge of the spreader 3.

Figure 3:
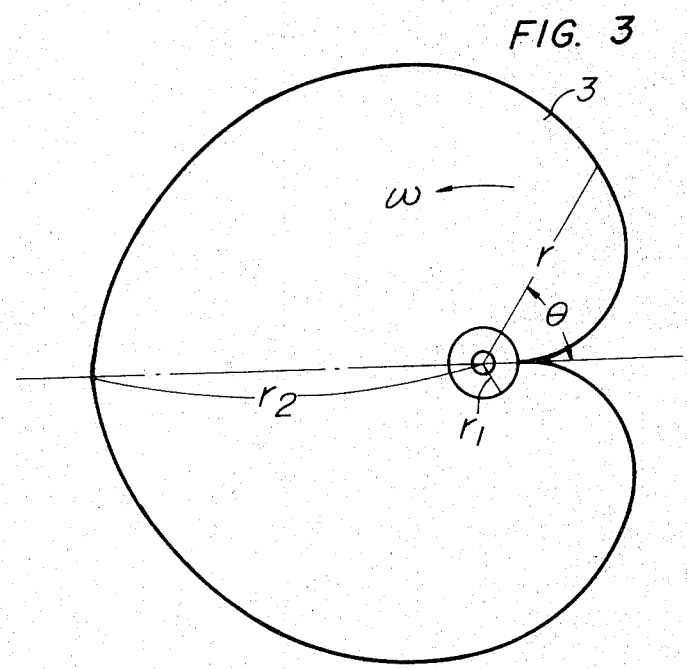

When indicating an optional point on the peripheral edge of the spreader 3 by polar coordinates $(r, \theta)$ as shown in FIG. 3, and further representing the thickness of the granular substance layer formed in the container 1 on each revolution of the spreader 3 by $C_1$, the distance from the center of rotation of said spreader to a point on the peripheral edge of the spreader at an angle of rotation $\theta + d\theta$, slightly greater than $\theta$, by $r + dr$ and the volume of granular substance supplied through the conduit 2 for every second by $q$, the volume of granular substance to be supplied onto the spreader per second in the region $d\theta$ defined by $r$ and $r + dr$ is represented by $\frac{q}{2\pi} d\theta$. Therefore, when assuming that the spreader 3 is rotated at an angular velocity $\omega$, the volume of granular substance to be supplied in the region $d\theta$ on one complete revolution of the spreader is represented by $\frac{q}{2\pi} d\theta \cdot \frac{2\pi}{\omega}$. On the other hand, the area over which the granular substance is to be distributed from the aforesaid region $d\theta$ of the spreader during each revolution of said spreader, that is, the area of the ring-shaped portion between two circles of radiuses $r$ and $r + dr$, is $2\pi r \cdot dr$. Therefore, the thickness $C_1$ of the granular substance layer formed is expressed by the formula $$C_1 = \frac{\frac{q}{2\pi} d\theta \cdot \frac{2\pi}{\omega}}{2\pi r \cdot dr}$$

Namely, $$\frac{q}{2\pi} d\theta / r\omega dr = C_1 \quad (1)$$

wherein $q$ is the volume of the granular substance discharged from the conduit 2 in every second, $\omega$ is the angular velocity of the spreader 3, and $r$ is the distance from the center of rotation to the peripheral edge of the spreader. Integration of equation (1) will result in:

$$\frac{q}{2\pi} \theta = \frac{1}{2} C_1 \omega r^2 + c_2 \quad (2)$$

wherein $C_2$ is the integration constant.

Here, the radius of a projection formed at the center of rotation of the spreader 3 to constitute the rotating means and receive therein the end of the conduit 2 is represented by $r_1$ and the maximum value of $r$ as determined by the inner diameter of the container 1 by $r_2$, equation (2) may be stated for the boundary conditions of $r = r_1$ when $\theta = 0$ and $r = r_2$ when $\theta = \pi$ wherein $0 \leq \theta \leq \pi$ and for the boundary conditions of $r = r_1$ when $\theta = 0$ and $r = r_2$ when $\theta = 2\pi$ $$\frac{\theta}{2\pi}(r_2^2 - r_1^2) = r^2 - r_1^2 \quad (4)$$

wherein $0 \leq \theta \leq 2\pi$.

Equations (3) and (4) above are both those which define the profile of the peripheral edge of the spreader 3 which enables the granular substance to be filled in the container in a uniform thickness when said spreader is rotated at a constant rate of speed. Examples of the spreader 3 the peripheral edges of which have profiles to satisfy equations (3) and (4) respectively are shown in FIGS. 3 and 4.

FIG. 3 shows a profile of the peripheral edge of the spreader composed of two semiheart-shaped curved lines symmetrical with respect to the central axis, the first one of said semiheart-shaped curved lines being drawn by the radius $r$ when said radius $r$ is rotated through the range of angle of $0 \leq \theta \leq \pi$ and another of said semiheart-shaped curved line being drawn symmetrically by the radius $r$ through the other range of angle $\pi \leq \theta \leq 2\pi$.

Figure 4:
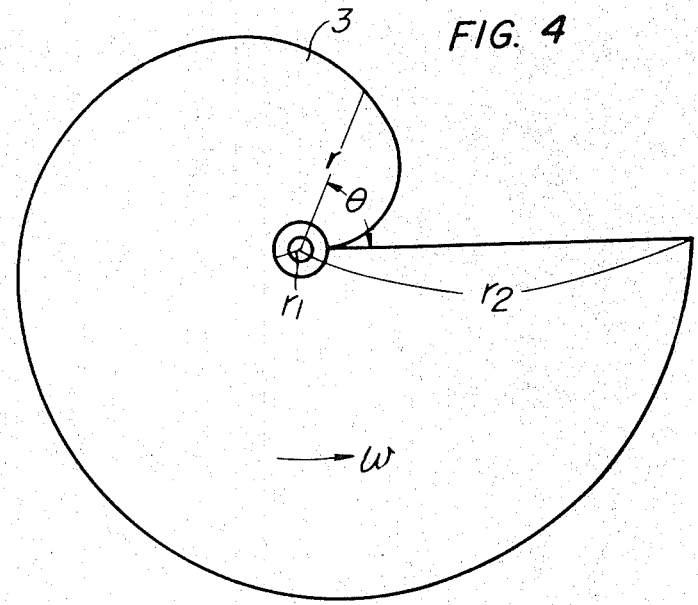
FIGS. 3 and 4 are respectively views showing the configuration of spreading means used in the apparatus of the invention by way of polar coordinates.

Either one of the spreader of the profile shown in FIG. 3 and the spreader of the profile shown in FIG. 4 is capable of filling the granular substance with a uniform particles size distribution.

Therefore, equations (3) and (4) may be combined into the following equation:

$$r^2 = r_1^2 + \frac{\theta}{n\pi}(r_2^2 - r_1^2)$$

wherein $n$ is 1 or 2.

The granular substance is not fed immediately below the projection formed at the center of rotation of the spreader 3 but this problem can be easily solved by either making the radius $r_1$ of said projection as small as possible or providing a suitable aperture at the bottom of said projection for the passage of the granular substance therethrough.

In the drawings, reference numeral 12 designates liquid discharge ports through which the liquid is discharged from the container to maintain the liquid surface 5 at a predetermined level, with the spreader 3 floating thereon, during charging of the granular substance into said container; 13 designates a drain port through which the liquid in the container is discharged therefrom after the container is filled with the granular substance under prescribed conditions; and 14 designates a lattice.

As described above, the apparatus of this invention wherein a granular substance is stacked in the container by means of the novel spreader whose peripheral edge has a unique profile and which is rotated at a substantially constant rate of speed, has the practical advantage that a packed bed of granular substance can be obtained which is as a whole substantially uniform in particle size distribution.

Further, an even better filling result can be obtained when the filling operation is performed with a liquid contained in the container. It is also be noted that the apparatus of the invention is of great practical value, particularly when the granular substance handled is toxic to the human body or when the filling operation is desired to be performed automatically.

I claim:

1. A granular substance filling apparatus, comprising a container for receiving a granular substance therein; granular substance spreading means disposed in said container for rotation at a constant rate of speed, said spreading means having a sloped surface expanding radially from the center of rotation thereof and such a peripheral edge profile which substantially satisfies the equation $$r^2 = r_1^2 + \frac{\theta}{n\pi}(r_2^2 - r_1^2)$$

wherein $n$ is 1 or 2, $r$ the distance from the center of rotation to the peripheral edge of the spreading means at $\theta$, $r_1$ the radius of a projection formed at the center of rotation of the spreading means, $r_2$ the maximum value or $r$ as determined by the inner diameter of the container and $\theta$ the angle of rotation of $r$ from the center of rotation of the spreading means; and means for supplying the granular substance to the center of 2. A granular substance filling apparatus as defined in claim 1, wherein means is provided for supplying to the center of rotation of said spreading means a mixture of a fluid and a granular substance.

3. A granular substance filling apparatus as defined in claim 1, wherein said spreading means is floated on a liquid for free rotation at a constant rate of speed and provided with impeller means so that said spreading means may be rotated by the coaction between the mixture of fluid and granular substance and said impeller means.

4. A granular substance filling apparatus as defined in claim 1, wherein said spreading means is provided on its sloped surface with a plurality of partition plates extending radially from the center of rotation thereof.